US 11,636,017 B2

(12) United States Patent
Hong

(10) Patent No.: US 11,636,017 B2
(45) Date of Patent: Apr. 25, 2023

(54) CONTROLLER AND METHOD OF OPERATING THE SAME

(71) Applicant: SK hynix Inc., Gyeonggi-do (KR)

(72) Inventor: Sung Kwan Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 292 days.

(21) Appl. No.: 16/983,359

(22) Filed: Aug. 3, 2020

(65) Prior Publication Data

US 2021/0255941 A1 Aug. 19, 2021

(30) Foreign Application Priority Data

Feb. 13, 2020 (KR) .................. 10-2020-0017730

(51) Int. Cl.
| | |
|---|---|
| *G06F 11/00* | (2006.01) |
| *G06F 11/30* | (2006.01) |
| *G06F 9/30* | (2018.01) |
| *G06F 12/0891* | (2016.01) |
| *G06F 1/30* | (2006.01) |
| *G06F 12/02* | (2006.01) |

(52) U.S. Cl.
CPC ............ *G06F 11/3037* (2013.01); *G06F 1/30* (2013.01); *G06F 9/30047* (2013.01); *G06F 11/3058* (2013.01); *G06F 12/0246* (2013.01); *G06F 12/0891* (2013.01)

(58) Field of Classification Search
CPC ............ G06F 11/3089; G06F 11/3037; G06F 11/3058; G06F 11/1012
See application file for complete search history.

(56) References Cited

U.S. PATENT DOCUMENTS

| | | | | |
|---|---|---|---|---|
| 9,164,887 | B2 * | 10/2015 | Chiueh | G06F 12/0246 |
| 10,871,924 | B1 * | 12/2020 | Lin | G06F 3/0659 |
| 11,347,887 | B2 * | 5/2022 | Zonouz | G06F 21/6254 |
| 2016/0179625 | A1 * | 6/2016 | Hong | G11C 11/5628 |
| | | | | 711/103 |

FOREIGN PATENT DOCUMENTS

| | | |
|---|---|---|
| KR | 10-2014-0112349 | 9/2014 |
| KR | 10-2018-0110473 | 10/2018 |

* cited by examiner

*Primary Examiner* — Amine Riad
(74) *Attorney, Agent, or Firm* — IP & T Group LLP

(57) ABSTRACT

A controller controls an operation of a semiconductor memory device including a plurality of memory blocks. The controller includes a command generator, a sudden power off (SPO) sensor, an SPO information storage, and a block scan controller. The command generator generates a command for controlling the semiconductor memory device. The SPO sensor generates an SPO sensing signal by sensing occurrence of SPO. The SPO information storage stores SPO block information indicating a memory block that is a target of a current operation (target memory block) in response to the SPO sensing signal. The block scan controller controls the command generator to perform a scan operation on the plurality of memory blocks, except for the target memory block, in response to the SPO block information.

20 Claims, 15 Drawing Sheets

CONTROLLER AND METHOD OF OPERATING THE SAME

CROSS-REFERENCE TO RELATED APPLICATION

The present application claims priority under 35 U.S.C. § 119(a) to Korean patent application number 10-2020-0017730, filed on Feb. 13, 2020, which is incorporated herein by reference in its entirety.

BACKGROUND

Field of Invention

The present disclosure relates to an electronic device, and more particularly, to a controller that controls an operation of a semiconductor memory device, and a method of operating the controller.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device has been designed in order to resolve a limit of integration of a two-dimensional semiconductor memory device, and may include a plurality of memory cells that are vertically stacked on a semiconductor substrate.

A controller may control an operation of the semiconductor memory device.

SUMMARY

An embodiment of the present disclosure provides a controller having improved scan performance.

Another embodiment of the present disclosure provides a method of operating a controller having improved scan performance.

A controller according to an embodiment of the present disclosure controls an operation of a semiconductor memory device including a plurality of memory blocks. The controller includes a command generator, a sudden power off (SPO) sensor, an SPO information storage, and a block scan controller. The command generator generates a command for controlling the semiconductor memory device. The SPO sensor generates an SPO sensing signal by sensing occurrence of SPO. The SPO information storage stores SPO block information indicating a memory block that is a target of a current operation (target memory block) in response to the SPO sensing signal. The block scan controller controls the command generator to perform a scan operation on the plurality of memory blocks, except for the target memory block, in response to the SPO block information.

In an embodiment, the SPO information storage may store an SPO block table. The SPO information storage may register the target memory block in the SPO block table, in response to the SPO sensing signal.

In an embodiment, the SPO sensor may sense occurrence of the SPO to generate an SPO control signal. The command generator may generate one or more commands for controlling an end operation performed in correspondence with the SPO in response to the SPO control signal.

In an embodiment, the end operation may include flushing write data received from a host by the semiconductor memory device.

In an embodiment, the end operation may include storing an updated mapping table in the semiconductor memory device.

In an embodiment, the block scan controller may generate a scan control signal for controlling a scan operation on the plurality of memory blocks, except the target memory block, based on the SPO block information and transfer the scan control signal to the command generator. The command generator may generate a command for controlling the scan operation based on the scan control signal.

In an embodiment, the SPO block information may indicate a memory block registered in the SPO block table. The block scan controller may generate the scan control signal to perform a scan operation on the memory blocks except for the memory blocks indicated by the SPO block information among the plurality of memory blocks.

In an embodiment, the controller may further include a block information storage. The block information storage may store information indicating a block state for each of the plurality of memory blocks.

In an embodiment, when at least one memory block among the plurality of memory blocks is switched from an open block to a free block, the block information storage may generate free block information indicating a memory block switched to the free block and transfer the free block information to the SPO information storage.

In an embodiment, the SPO information storage may delete a memory block corresponding to the free block information from the SPO block table.

A method of operating a controller according to another embodiment of the present disclosure controls a semiconductor memory device including a plurality of memory blocks. The method of operating the controller includes sensing occurrence of sudden power off (SPO), registering a memory block that is a target of a current operation (target memory block), among the plurality of memory blocks, in an SPO block table, when the SPO occurs, determining whether to perform a scan operation of the semiconductor memory device, identifying at least one memory block including the target memory block registered in the SPO block table, and performing a scan operation on the plurality of memory blocks except for the identified at least one memory block.

In an embodiment, the method may further include performing an end operation corresponding to the SPO after registering the target memory block.

In an embodiment, the end operation may include flushing write data received from a host by the semiconductor memory device.

In an embodiment, the end operation may include storing an updated mapping table in the semiconductor memory device.

In an embodiment, after registering the target memory block, the method may further include switching at least one open memory block registered in the SPO block table to a free memory block, and deleting the at least one switched memory block from the SPO block table.

In an embodiment, performing the scan operation on the plurality of memory blocks except for the identified at least one memory block may include initializing an index indicating a memory block on which a scan operation is to be performed, determining whether a memory block of a current index is registered in the SPO block table, and selectively performing a scan operation on the memory block of the current index based on a result of the determination.

In an embodiment, selectively performing the scan operation on the memory block of the current index based on the result of the determination may include updating the index without performing the scan operation on the memory block of the current index when the memory block of the current index is registered in the SPO block table.

In an embodiment, selectively performing the scan operation on the memory block of the current index based on the result of the determination may include performing the scan operation on the memory block of the current index and updating the index when the memory block of the current index is not registered in the SPO block table.

A method of operating a controller according to still another embodiment of the present disclosure controls a semiconductor memory device including a plurality of memory blocks. The method of operating the controller includes determining whether to perform a scan operation on the semiconductor memory device, referring to sudden power off (SPO) block information on a memory block that is a target of an operation when SPO occurs, and selectively performing the scan operation on the plurality of memory blocks based on the SPO block information.

In an embodiment, selectively performing the scan operation may include performing the scan operation on the plurality of memory blocks except for the target memory block.

In an embodiment, selectively performing the scan operation on the plurality of memory blocks based on the SPO block information may include initializing an index indicating a memory block on which the scan operation is to be performed, determining whether a memory block of a current index corresponds to the SPO block information, and performing the scan operation on the memory block of the current index when the memory block of the current index does not correspond to the memory block corresponding to the SPO block information.

A memory system according to still another embodiment of the present disclosure includes a memory device and a controller. The memory device includes a plurality of memory blocks. The controller coupled to the memory device. The controller is suitable for performing an operation on a target memory block among the plurality of memory blocks, detecting whether sudden power off (SPO) occurs during the operation, identifying the target memory block, when it is detected that SPO occurred, and performing a scan operation on remaining memory blocks of the memory device, excluding the target memory block, based on the information.

The present technology may improve scan performance according to the controller and the method of controlling the controller.

DETAILED DESCRIPTION

Specific structural and functional description is presented herein to describe the embodiments of the present disclosure. The embodiments may be configured in various forms and carried out in various ways; thus, the present invention is not limited to the embodiments described herein. Also, throughout the specification, reference to "an embodiment," "another embodiment" or the like is not necessarily to only one embodiment, and different references to any such phrase are not necessarily to the same embodiment(s).

Figure 1:
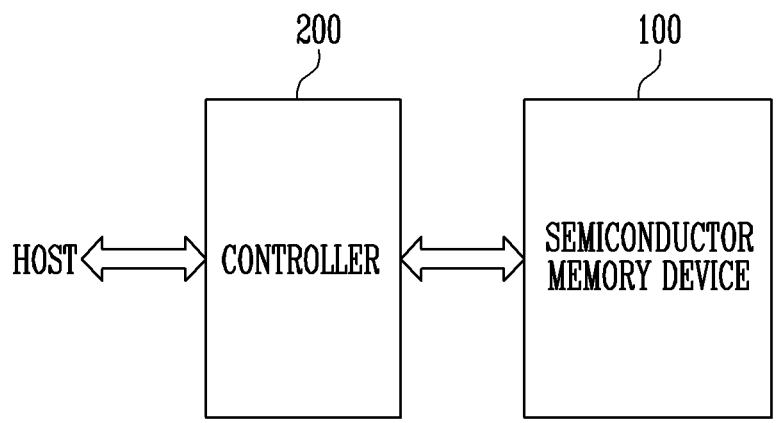
FIG. 1 is a block diagram illustrating an example of a memory system.

FIG. 1 is a block diagram illustrating an example of a memory system 1000.

Referring to FIG. 1, the memory system 1000 includes a semiconductor memory device 100 and a controller 200.

The semiconductor memory device 100 operates under control of the controller 200. More specifically, the semiconductor memory device 100 writes data to a memory cell array in response to a write request from the controller 200. When a write command, an address, and data are received as the write request from the controller 200, the semiconductor memory device 100 writes data to memory cells indicated by the address.

The semiconductor memory device 100 performs a read operation in response to a read request from the controller 200. When a read command and an address are received as the read request from the controller 200, the semiconductor memory device 100 reads data of memory cells indicated by the address and outputs the read data to the controller 200.

The semiconductor memory device 100 may be a NAND flash memory, a vertical NAND flash memory, a NOR flash memory, and a resistive random access memory (RRAM), a phase-change memory (PRAM), a magnetoresistive random access memory (MRAM), a ferroelectric random access memory (FRAM), a spin transfer torque random access memory (STT-RAM), or the like. In addition, the semiconductor memory device 100 of the present disclosure may be implemented in a three-dimensional array structure. The present disclosure may be applied to a flash memory device in which a charge storage layer is configured of a floating gate and a charge trap flash (CTF) in which the charge storage layer is configured of an insulating film.

The controller 200 is coupled between the semiconductor memory device 100 and a host. The controller 200 is configured to interface the host and the semiconductor memory device 100. The controller 200 may transmit the write request or the read request to the semiconductor memory device 100 under control of the host.

The controller 200 may perform a scan operation on a plurality of memory blocks in the semiconductor memory device 100. In the present specification, the "scan operation" on the plurality of memory blocks may mean an operation of checking a state of memory cells in each memory block.

For example, when the semiconductor memory device 100 is configured as a flash memory device, data loss may occur due to a retention characteristic of a corresponding memory cell, i.e., the cell may not retain the data after a certain amount of time elapses after the memory cell is programmed. Alternatively, data loss of the memory cell may be caused by temperature of the semiconductor memory device 100. In particular, when a memory cell, or memory block containing the cell, has not been accessed for a long time after programming, the probability of data loss increases.

Before such data loss occurs, the controller 200 may scan memory blocks in the semiconductor memory device 100 periodically or under a specific condition. For example, the scan operation on the memory block may include a process of reading data stored in a corresponding memory block and performing an error correction operation. When the number of error bits of data in a particular memory cell is less than or equal to a certain level as a result of error correction, it may be determined that the corresponding memory block is not deteriorated. When the number of error bits exceeds the certain level as the result of the error correction, it may be determined that there is a high probability that data stored in the corresponding memory block is lost. Alternatively, when the number of error bits exceeds the certain level as the result of the error correction, it may be determined that one or more memory cells in the corresponding memory block are deteriorated. In either case, it is necessary to recover the data stored in the corresponding memory block and perform an appropriate process operation. Such a series of processes may be referred to as the "scan operation" on the memory blocks in the semiconductor memory device 100.

When the memory system 1000 is used in a system such as a mobile device, the supply of power to the memory system 1000 may be suddenly cut off, that is, sudden power off (SPO) may occur. When SPO occurs during a program operation on a specific memory block of the semiconductor memory device 100, data may not be properly programmed into the corresponding memory block. When the memory system 1000 is turned off by the SPO and then turned back on, the controller 200 may perform the scan operation on the plurality of memory blocks in the semiconductor memory device 100. For a memory block that was performing a program operation immediately before SPO occurrence, there is a probability that, through the scan operation, it may be incorrectly determined that data of the corresponding memory block is lost or one or more memory cells in the corresponding memory block are deteriorated.

In accordance with an embodiment of the present disclosure, when an SPO occurs while performing an operation, e.g., program operation, on a specific memory block, the corresponding memory block is registered in an SPO block table. Thereafter, when the controller performs a scan operation on memory blocks in the semiconductor memory device 100, the memory blocks registered in the SPO block table are excluded from the scan operation. That is, the scan operation is not performed on any memory block registered in the SPO block table. Accordingly, a situation in which a scan operation incorrectly reveals that a memory block, or memory cells therein, in which data is incompletely stored as a result of SPO is deteriorated may be prevented.

Figure 2:
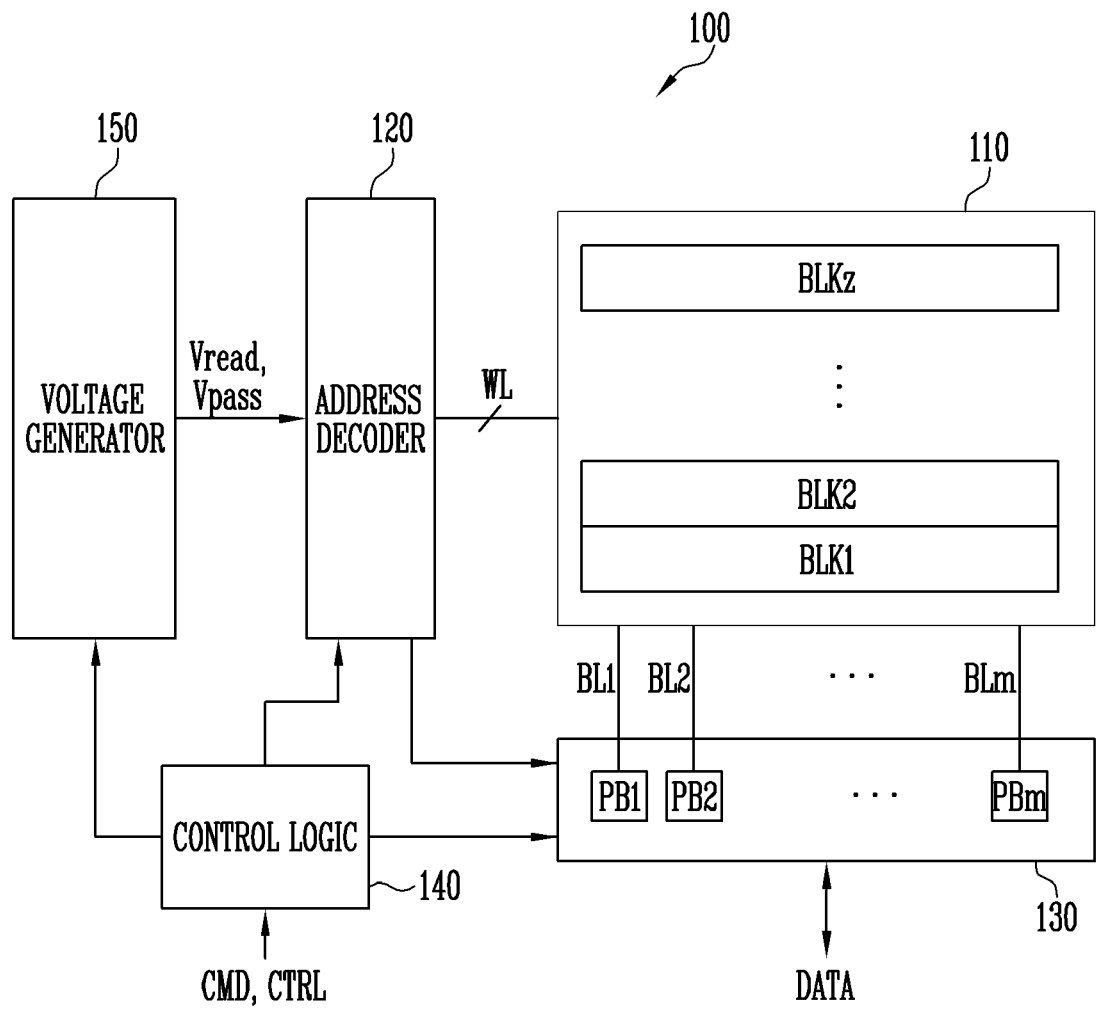
FIG. 2 is a block diagram illustrating a semiconductor memory device, such as that of FIG. 1.

FIG. 2 is a block diagram illustrating the semiconductor memory device 100 of FIG. 1.

Referring to FIG. 2, the semiconductor memory device 100 includes a memory cell array 110, an address decoder 120, a read and write circuit 130, control logic 140, and a voltage generator 150.

The memory cell array 110 includes a plurality of memory blocks BLK1 to BLKz. The plurality of memory blocks BLK1 to BLKz are coupled to the address decoder 120 through word lines WL. The plurality of memory blocks BLK1 to BLKz are coupled to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured with a vertical channel structure. The memory cell array 110 may be configured as a two-dimensional structure. In another embodiment, the memory cell array 110 may be configured as a three-dimensional structure. Each of the plurality of memory cells in the memory cell array 110 may store at least one bit of data. In an embodiment, each of the plurality of memory cells in the memory cell array 110 may be a single-level cell (SLC) storing one bit of data. In another embodiment, each of the plurality of memory cells may be a multi-level cell (MLC) storing two bits of data. In still another embodiment, each of the plurality of memory cells may be a triple-level cell storing three bits of data. In still another embodiment, each of the plurality of memory cells may be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is coupled to the memory cell array 110 through the word lines WL. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated by the voltage generator 150 to a selected word line of the selected memory block at a time of a read voltage application operation during a read operation, and applies a pass voltage Vpass to the remaining unselected word lines. In addition, during a program verify operation, the address decoder 120 applies a verify voltage generated by the voltage generator 150 to the selected word line of the selected memory block, and applies the pass voltage Vpass to the remaining unselected word lines.

The address decoder 120 is configured to decode a column address of the received addresses. The address decoder 120 transmits the decoded column address to the read and write circuit 130.

A read operation and a program operation of the semiconductor memory device 100 are performed in a unit of a page. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are coupled to the memory cell array 110 through the bit lines BL1 to BLm. During the read operation and the program verify operation, in order to sense a threshold voltage of the memory cells, the plurality of page buffers PB1 to PBm senses a change of an amount of a current flowing according to a programmed state of a corresponding memory cell through a sensing node while continuously supplying a sensing current to the bit lines coupled to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is coupled to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operation of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140.

The address decoder 120, the read and write circuit 130, and the voltage generator 150 may function as a "peripheral circuit" that performs a read operation, a write operation, and an erase operation on the memory cell array 110. The peripheral circuit performs the read operation, the write operation, and the erase operation on the memory cell array 110 under the control of the control logic 140.

Figure 3:
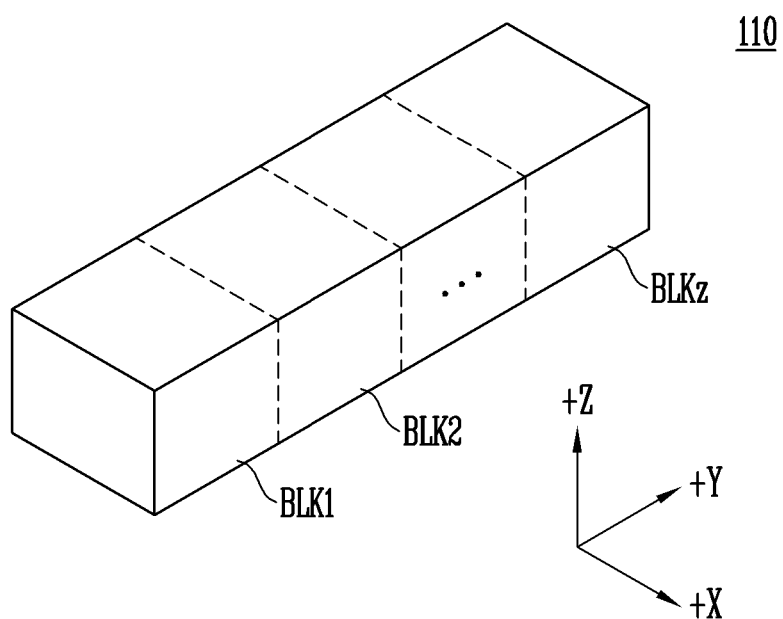
FIG. 3 is a diagram illustrating an embodiment of a memory cell array, such as that of FIG. 2.

FIG. 3 is a diagram illustrating an embodiment of the memory cell array 110 of FIG. 2.

Referring to FIG. 3, the memory cell array 110 includes a plurality of memory blocks BLK1 to BLKz. Each memory block may have a three-dimensional structure. Each memory block includes a plurality of memory cells stacked on a substrate. Such plurality of memory cells are arranged along a +X direction, a +Y direction, and a +Z direction. A structure of each memory block is described in more detail with reference to FIGS. 4 and 5.

Figure 4:
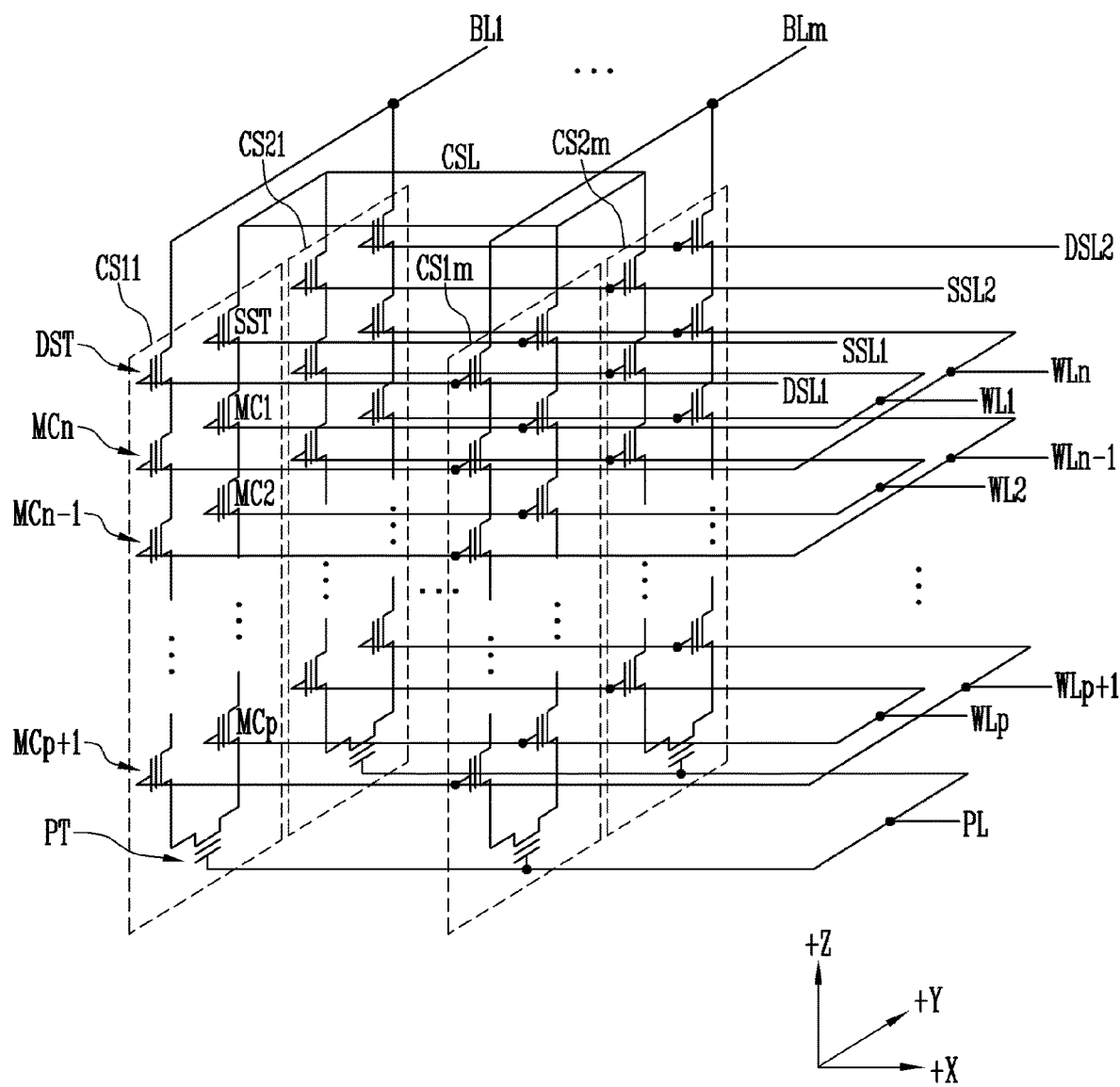
FIG. 4 is a circuit diagram illustrating a representative memory block BLKa of memory blocks BLK1 to BLKz of FIG. 2.

FIG. 4 is a circuit diagram illustrating a representative memory block BLKa of the memory blocks BLK1 to BLKz of FIG. 2.

Referring to FIG. 4, the memory block BLKa includes a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (that is, the +X direction). In FIG. 4, two cell strings are arranged in a column direction (that is, the +Y direction). However, this is for clarity; it may be understood that three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing the channel layer, the tunneling insulating film, the charge storage film, and/or the blocking insulating film may be provided in each cell string.

The source select transistor SST of each cell string is connected between a common source line CSL and the memory cells MC1 to MCp.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1$m$ of a first row are connected to a first source select line SSL1. The source select transistors of the cell strings CS21 to CS2$m$ of a second row are connected to a second source select line SSL2.

In another embodiment, the source select transistors of the cell strings CS11 to CS1$m$ and CS21 to CS2$m$ may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in the −Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The drain select transistor DST of the cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting any one of the drain select lines DSL1 and DSL2. One page of the selected cell strings may be selected by selecting any one of the word lines WL1 to WLn.

In another embodiment, even bit lines and odd bit lines may be provided instead of the first to m-th bit lines BL1 to BLm. In addition, even-numbered cell strings among the cell strings CS11 to CS1m or CS21 to CS2m arranged in the row direction may be connected to the even bit lines, and odd-numbered cell strings among the cell strings CS11 to CS1m or CS21 to CS2m arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less memory cells are provided, the size of the memory block BLKa may be reduced; however, the reliability of the operation for the memory block BLKa may be reduced.

In order to efficiently control the dummy memory cell(s), each dummy memory cell may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

Figure 5:
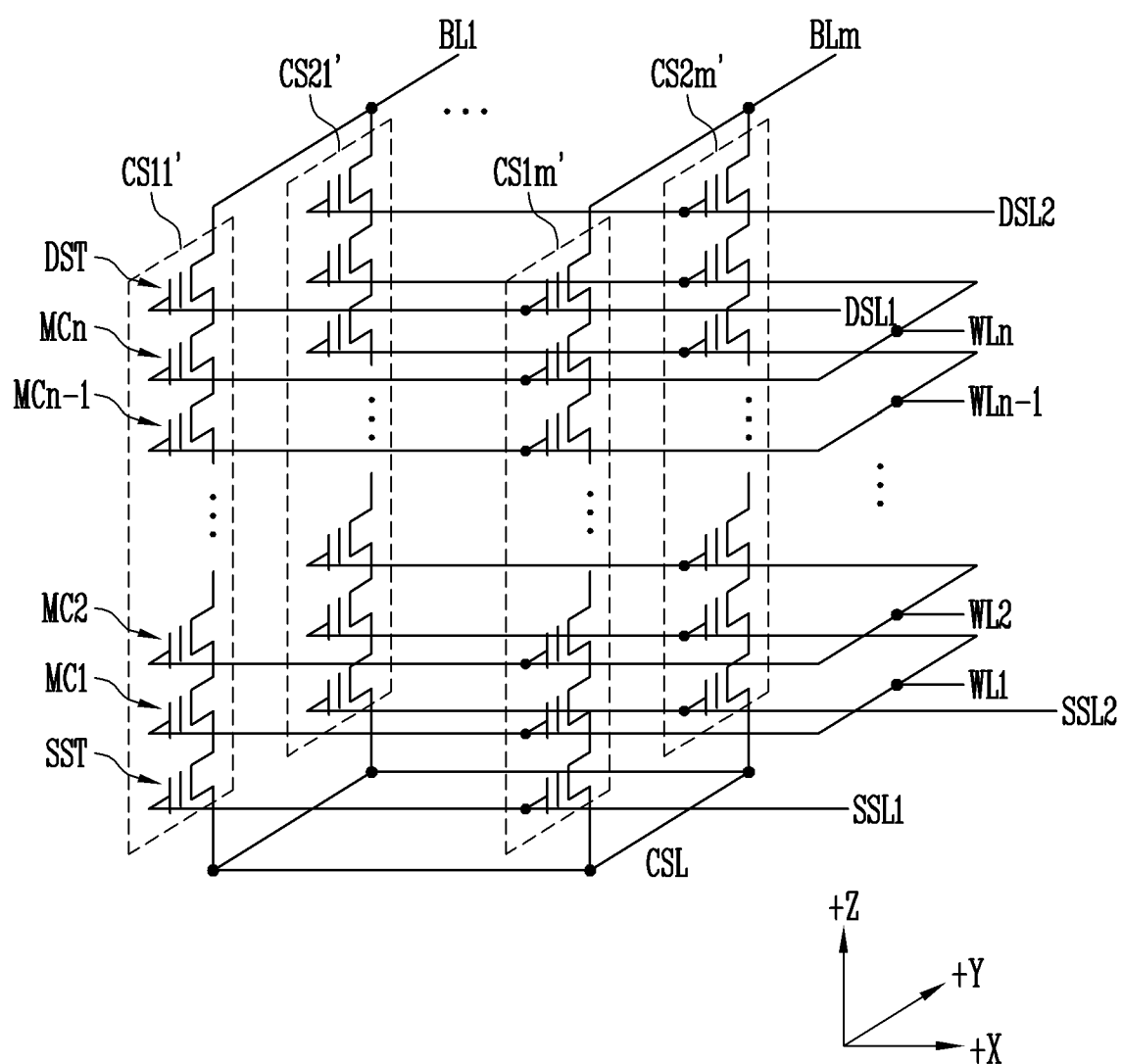
FIG. 5 is a circuit diagram illustrating another embodiment of a representative memory block BLKb of the memory blocks BLK1 to BLKz of FIG. 3.

FIG. 5 is a circuit diagram illustrating another embodiment of a representative memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLK1'.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. In another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to the memory block BLKa of FIG. 4 except that the pipe transistor PT is excluded from each cell string.

In another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

In an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced; however, the reliability of the operation for the memory block BLKb may be reduced.

In order to efficiently control the dummy memory cell(s), each dummy memory cell may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
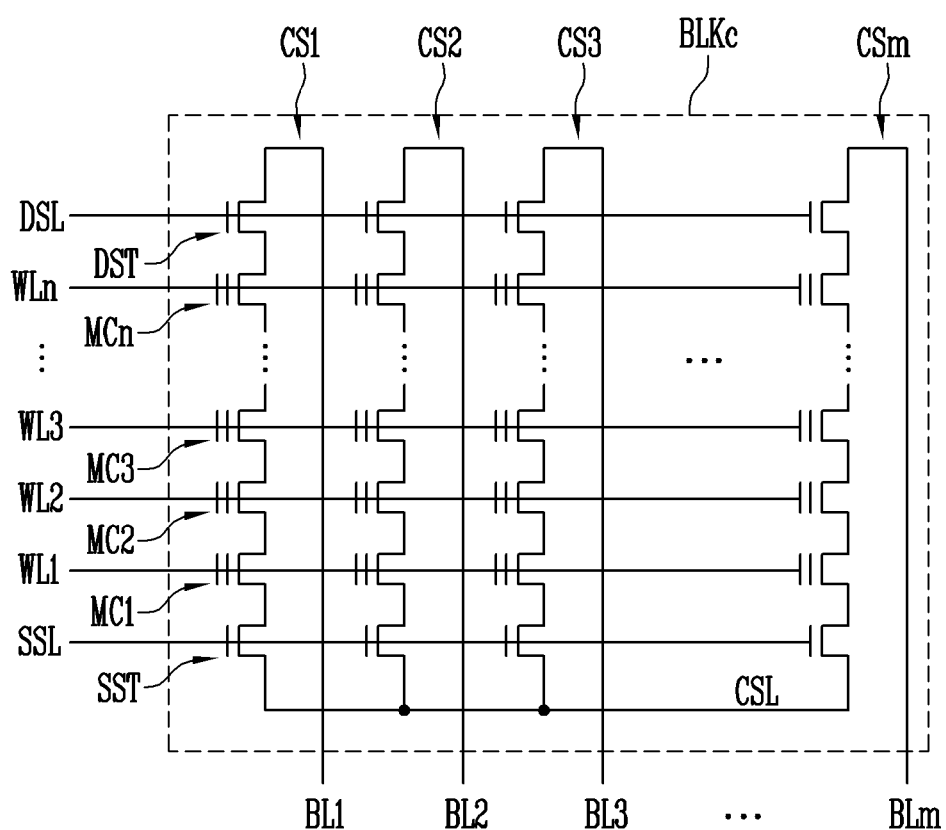
FIG. 6 is a circuit diagram illustrating an embodiment of a representative memory block BLKc of the memory blocks BLK1 to BLKz in a memory cell array, such as that of FIG. 2.

FIG. 6 is a circuit diagram illustrating an embodiment of a representative memory block BLKc of the memory blocks BLK1 to BLKz in the memory cell array 110 of FIG. 2.

Referring to FIG. 6, the memory block BKLc includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating film, a charge storage film, and a blocking insulating film. In an embodiment, a pillar for providing the channel layer may be provided in each cell string. In an embodiment, a pillar for providing the channel layer, the tunneling insulating film, the charge storage film, and/or the blocking insulating film may be provided in each cell string.

The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting any one of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

As shown in FIGS. 3 to 5, the memory cell array 110 of the semiconductor memory device 100 may be configured as an array of a three-dimensional structure. Alternatively, as shown in FIG. 6, the memory cell array 110 of the semiconductor memory device 100 may be configured as a two-dimensional structure.

Figure 7:
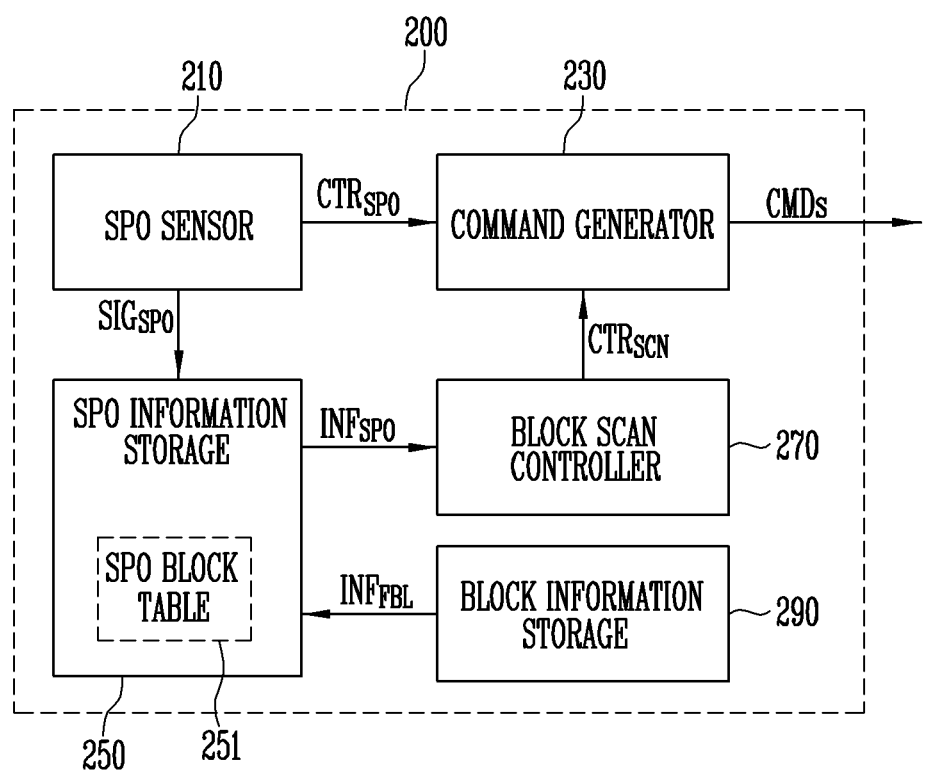
FIG. 7 is a block diagram illustrating a controller according to an embodiment of the present disclosure.
Figure 8:
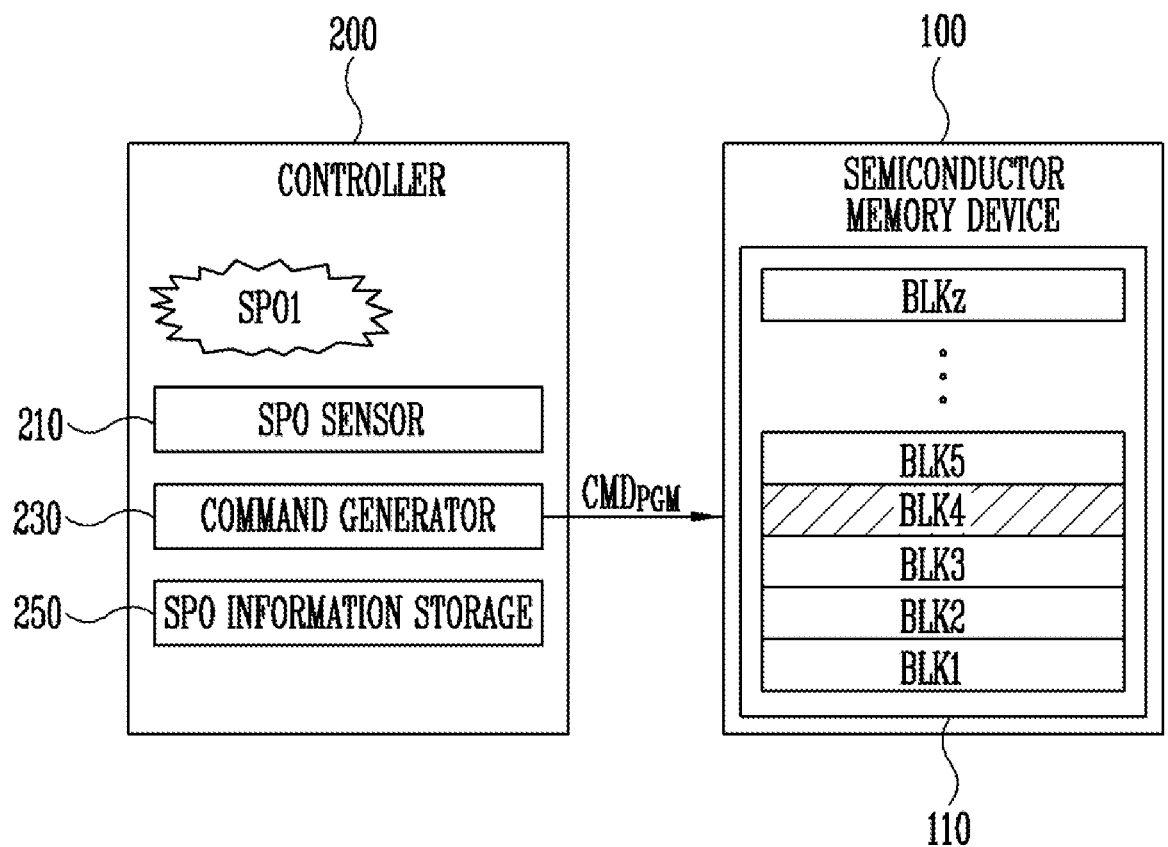
FIGS. 8A and 8B are diagrams for describing an update operation of an SPO block table according to first sudden power off (SPO).
Figure 9:
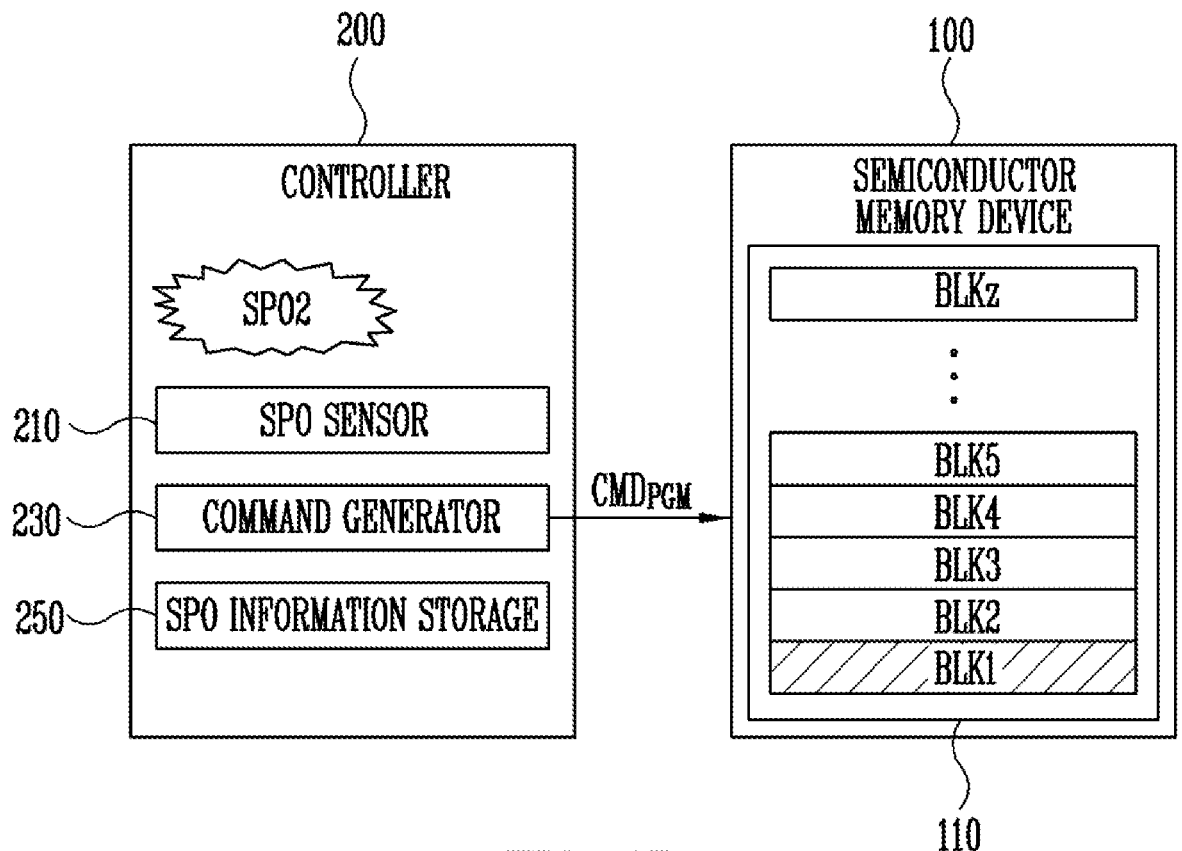
FIGS. 9A and 9B are diagrams for describing an update operation of an SPO block table according to second SPO.

FIG. 7 is a block diagram illustrating the controller 200 according to an embodiment of the present disclosure.

Referring to FIG. 7, the controller 200 includes an SPO sensor 210, a command generator 230, an SPO information storage 250, a block scan controller 270, and block information storage 290.

The SPO sensor 210 may sense when an SPO has occurred to the memory system 1000 or the controller 200. For example, when a voltage supplied to the controller 200 rapidly decreases, the SPO sensor 210 may sense this and determine that an SPO has occurred. When it is determined that an SPO has occurred, the SPO sensor 210 may generate an SPO sensing signal $SIG_{SPO}$ and an SPO control signal $CTR_{SPO}$. The SPO sensing signal $SIG_{SPO}$ indicates that an SPO has occurred in the memory system 1000. The SPO sensing signal $SIG_{SPO}$ may be transferred to the SPO information storage 250. The SPO control signal $CTR_{SPO}$ may control subsequent operations to be performed as a result of SPO occurrence. In many cases, the memory system 1000 may include an internal temporary power supply (not shown) in addition to the external power supply. The temporary power supply may be implemented as a capacitor. When the SPO occurs, the memory system 1000 may continue to operate for a set time depending on the amount of power in the temporary power supply. During this time, the controller 200 may perform an end operation corresponding to the SPO. For example, the controller 200 may flush write data received from the host to the semiconductor memory device 100. In addition, the controller 200 may control the semiconductor memory device 100 to program an updated mapping table until immediately before the SPO occurrence. The mapping table may indicate a mapping relationship between a logical block address (LBA) and a physical block address (PBA) of data stored in the semiconductor memory device 100. The SPO control signal $CTR_{SPO}$ may be transferred to the command generator 230.

The command generator 230 may generate various commands CMDs for controlling an operation of the semiconductor memory device 100. The commands CMDs may include a program command, an erase command, a read command, and the like. In addition, the command CMDs may include a parameter setting command for setting various parameters for the operation of the semiconductor memory device 100. In response to the parameter setting command, the semiconductor memory device 100 may change and set a parameter required for operation. The command CMDs may include a parameter obtainment command for obtaining parameters currently set in the semiconductor memory device 100. In response to the parameter obtainment command, the semiconductor memory device 100 may transfer data related to the currently set parameter to the controller 200.

The SPO information storage 250 may store an SPO block table 251. The SPO block table 251 may be updated based on the SPO sensing signal $SIG_{SPO}$ received from the SPO sensor 210. For example, when the SPO sensing signal $SIG_{SPO}$ is received during a program operation on a specific memory block, the SPO information storage 250 may register a target memory block for a current operation in the SPO block table 251. Such a registration process is described later with reference to FIGS. 8A to 9B.

In an embodiment, the SPO information storage 250 may be configured as a non-volatile memory device. In this case, even though the memory system 1000 is turned off according to the SPO, the SPO block table 251 stored in the SPO information storage 250 is maintained.

As another example, the SPO information storage 250 may be configured as a volatile memory device. In this case, the SPO block table 251 may be stored in the semiconductor memory device 100 immediately before the memory system 1000 is turned off. In this case, the command generator 230 may generate a command for controlling the semiconductor memory device 100 to program the SPO block table, which is stored in the SPO information storage 250. When the memory system 1000 is turned off according to the SPO and then turned on again, data of the SPO block table stored in the semiconductor memory device 100 may be read and transferred to the SPO information storage 250.

The SPO information storage 250 may transfer information on a memory block that was a target of an operation at the time of the SPO occurrence, that is, the SPO block information $INF_{SPO}$ may be transferred to the block scan controller 270. The SPO information storage 250 may receive free block information $INF_{FBL}$ from the block information storage 290.

The block scan controller 270 controls the scan operation on the memory blocks in the semiconductor memory device 100. Specifically, the block scan controller 270 may determine to perform the scan operation on the memory blocks in the semiconductor memory device 100. In an example, the block scan controller 270 may determine to perform the scan operation for a set period of time at a particular frequency. In another example, the block scan controller 270 may determine to perform the scan operation when the memory system 1000 is turned on. In still another example, the block scan controller 270 may determine to perform the scan operation when the memory system 1000 is idle. In yet still another example, the block scan controller 270 may determine to perform the scan operation when a specific condition is satisfied.

When it is determined to perform the scan operation, the block scan controller 270 may transfer a scan control signal $CTR_{SCN}$ for controlling the scan operation to the command generator 230. The command generator 230 may generate at least one command configuring the scan operation and transfer the at least one command to the semiconductor memory device 100, based on the scan control signal $CTR_{SCN}$. For example, the command generator 230 may generate a read command to perform a read operation on any of the plurality of memory blocks in the semiconductor memory device 100, based on the scan control signal $CTR_{SCN}$. For example, when the read data is transferred to the controller 200 based on the read command, the controller 200 may perform an error correction operation for detecting whether or not the received data contains any errors, and if so, how many.

In an embodiment, the block scan controller 270 may receive the SPO block information $INF_{SPO}$ from the SPO information storage 250 and may generate the scan control signal $CTR_{SCN}$ to perform the scan operation based on the SPO block information $INF_{SPO}$. More specifically, the block scan controller 270 may generate the scan control signal $CTR_{SCN}$ to control the command generator 230 to not perform the scan operation on a memory block corresponding to the SPO block information $INF_{SPO}$. Accordingly, the SPO blocks registered in the SPO block table 251 are excluded from the scan operation, but all other memory blocks in the semiconductor memory device 100 are scanned. The scan operation based on the SPO block information $INF_{SPO}$ is described later with reference to FIGS. 11 to 13.

The block information storage 290 may store various pieces of information on the plurality of memory blocks in the semiconductor memory device 100. For example, the block information storage 290 may store information on a bad block among the plurality of memory blocks in the semiconductor memory device 100. The block information storage 290 may also store information on a reserved block that a user may not access among the plurality of memory blocks in the semiconductor memory device 100.

In an embodiment, the block information storage 290 may store information indicating whether each of the plurality of memory blocks in the semiconductor memory device 100 is currently a free block or an open block. A free block may mean a memory block that contains no valid data and thus capable of storing data. An open block may mean a memory block in which valid data is stored in at least some cells of that block. As the memory system 1000 operates, a free block may become an open block, and vice versa.

As an example, when a free block is determined as a target of a program operation and data is written in that block, that block then becomes an open block. As an example of a transition in the other direction, an open block selected as a victim block in a garbage collection operation may become a free block after all pieces of data are moved to another memory block.

When a specific block is switched from the open block to a free block, the block information storage 290 may generate free block information $INF_{FBL}$ that is information indicating the specific memory block switched to a free block. The free block information $INF_{FBL}$ indicates a memory block that has just switched from an open block to a free block by an operation such as garbage collection. The free block information $INF_{FBL}$ may be transferred to the SPO information storage 250.

The SPO information storage 250 may update the SPO block table 251 based on the free block information $INF_{FBL}$. More specifically, when a memory block indicated by the free block information $INF_{FBL}$ is registered in the SPO block table 251, the SPO information storage 250 may delete the corresponding memory block from the SPO block table 251. On the other hand, when a memory block indicated by the free block information $INF_{FBL}$ is not registered in the SPO block table 251, the SPO information storage 250 may not perform any operation and the SPO block table 251 may be maintained as it is. An update operation of the SPO block table 251 based on the free block information $INF_{FBL}$ is described later with reference to FIGS. 14A to 16.

FIGS. 8A and 8B are diagrams for describing the update operation of the SPO block table 251 according to first SPO. In FIG. 8A, for clarity, the block scan controller 270 and the block information storage 290 are omitted.

FIG. 8A shows a case where the first SPO (SPO1) occurs during an operation on a fourth memory block BLK4. FIG. 8B shows an embodiment of the SPO block table 251 updated according to the occurrence of the first SPO (SPO1).

Prior to occurrence of the first SPO (SPO1), the command generator 230 generates a program command $CMD_{PGM}$ for the fourth memory block BLK4 and transfers the program command $CMD_{PGM}$ to the semiconductor memory device 100. The semiconductor memory device 100 performs a program operation on the fourth memory block BLK4 in response to the program command $CMD_{PGM}$.

It is assumed that the first SPO (SPO1) occurs while the semiconductor memory device 100 performs the program operation on the fourth memory block BLK4. The SPO sensor 210 senses the first SPO (SPO1). The SPO sensor 210 generates the SPO sensing signal $SIG_{SPO}$ in response to the sensing of the first SPO (SPO1) and transfers the SPO sensing signal $SIG_{SPO}$ to the SPO information storage 250.

The SPO information storage 250 registers the memory block that is the target of the current operation (target memory block) in the SPO block table 251 in response to the SPO sensing signal $SIG_{SPO}$. Since the program operation is currently being performed on the fourth memory block BLK4, BLK4 is the target memory block in this case and the SPO information storage 250 registers the fourth memory block BLK4 in the SPO block table 251 as shown in FIG. 8B.

Referring to FIG. 8B, the SPO block table 251 may include a serial number and a block identifier (ID) corresponding thereto. However, this is another embodiment, and the SPO block table 251 may not include a serial number. In this case, the SPO block table 251 may include only the block ID indicating the SPO block without a serial number. In the illustrated example of FIG. 8B, the fourth memory block BLK4 is registered as a first SPO block according to the first SPO (SPO1) shown in FIG. 8A.

FIGS. 9A and 9B are diagrams for describing the update operation of the SPO block table 251 according to a second SPO. In FIG. 9A, for clarity, the block scan controller 270 and the block information storage 290 are omitted.

FIG. 9A shows a case where the second SPO (SPO2) occurs during an operation on a first memory block BLK1. FIG. 9B shows an embodiment of the SPO block table 251 updated according to the occurrence of the second SPO (SPO2).

Prior to occurrence of the second SPO (SPO2), the command generator 230 generates a program command $CMD_{PGM}$ for the first memory block BLK1 and transfers the program command $CMD_{PGM}$ to the semiconductor memory device 100. The semiconductor memory device 100 performs a program operation on the first memory block BLK1 in response to the program command $CMD_{PGM}$.

It is assumed that the second SPO (SPO2) occurs while the semiconductor memory device 100 performs the program operation on the first memory block BLK1. The SPO sensor 210 senses the second SPO (SPO2). The SPO sensor 210 generates the SPO sensing signal $SIG_{SPO}$ in response to the sensing of the second SPO (SPO2) and transfers the SPO sensing signal $SIG_{SPO}$ to the SPO information storage 250.

The SPO information storage 250 registers the memory block that is the target of the current operation (target memory block) in the SPO block table 251 in response to the SPO sensing signal $SIG_{SPO}$. Since the program operation is currently being performed on the first memory block BLK1, the SPO information storage 250 registers the first memory block BLK1 in the SPO block table 251 as shown in FIG. 9B. In the illustrated example of FIG. 9B, the first memory block BLK1 is registered as a second SPO block according to the second SPO (SPO2) shown in FIG. 9A.

Figure 10:
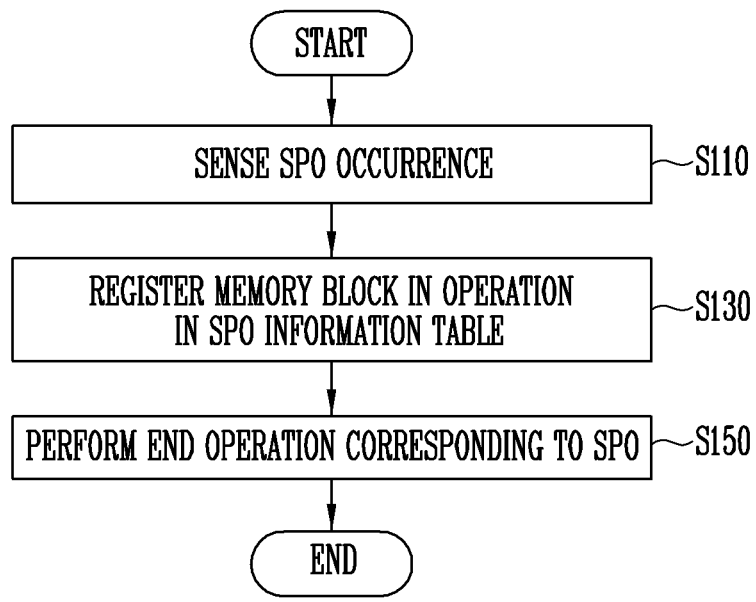
FIG. 10 is a flowchart illustrating a method of operating the controller according to an embodiment of the present disclosure.

FIG. 10 is a flowchart illustrating a method of operating the controller 200 according to an embodiment of the present disclosure. More specifically, FIG. 10 shows a method of operating the controller 200 when the SPO occurs.

The method of operating the controller 200 shown in FIG. 10 includes sensing occurrence of an SPO (S110), registering a memory block in operation in an SPO information table (S130), and performing an end operation corresponding to the SPO (S150).

In step S110, the SPO sensor 210 of the controller 200 may sense the SPO. As described above, the SPO sensor 210 may determine that the SPO occurs when a voltage input to a power supply terminal rapidly decreases. The SPO sensor 210 may transfer the SPO sensing signal $SIG_{SPO}$ to the SPO information storage 250 in response to the sensed SPO.

In step S130, the SPO information storage 250 may register the memory block on which an operation is currently being performed (target memory block) in the SPO block table 251 in response to the SPO sensing signal $SIG_{SPO}$. The target memory block may be determined based on address information of a specific command generated from the command generator 230. For example, in the example of FIG. 8A, when the command generator 230 transfers an address indicating the fourth memory block BLK4 to the semiconductor memory device 100 together with the program command $PGM_{CMD}$, the target memory block may be determined as the fourth memory block BLK4 based on the address. As shown in FIG. 8B, the SPO information storage 250 registers the fourth memory block BLK4, as the target memory block, in the SPO block table 251.

In step S150, the controller 200 performs the end operation corresponding to the SPO. As described above, until the temporary power is exhausted after the SPO occurrence, the controller 200 may flush the write data received from the host to the semiconductor memory device 100 or control the semiconductor memory device 100 to program the updated mapping table up until the temporary power is exhausted and thus the SPO occurs. The corresponding end operation may be completed, after which the entire memory system 1000 may be turned off as a result of the SPO.

As shown in FIG. 10, when the SPO occurs in the memory system 1000 or the controller 200, the controller 200 registers the target memory block in the SPO block table 251 as the SPO block. Accordingly, the memory block registered in the SPO block table 251 may be excluded from the scan operation when the scan operation is performed for the semiconductor memory device 100 in the future. As a result, an unnecessary scan operation on the SPO block may be omitted, and a situation in which it is incorrectly determined that memory cells of the memory block in which data is incompletely stored by the SPO is deteriorated may be prevented.

Figure 11:
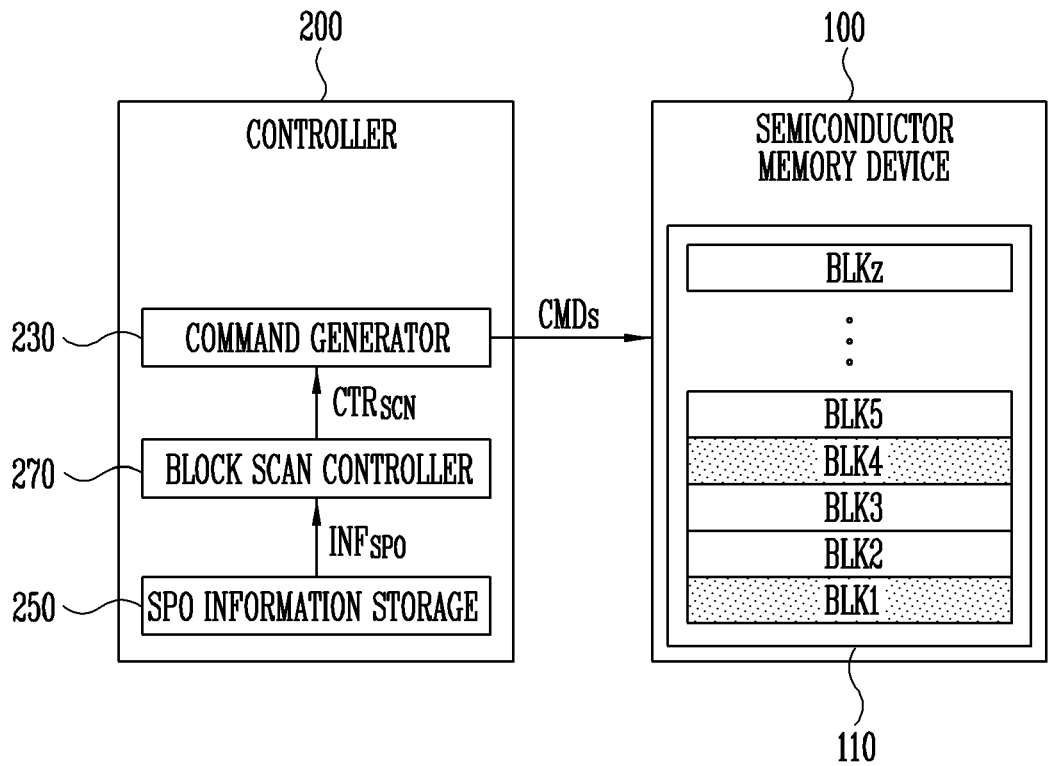
FIG. 11 is a diagram for describing a scan operation based on SPO block information.

FIG. 11 is a diagram for describing the scan operation based on the SPO block information. In FIG. 11, for clarity, the SPO sensor 210 and the block information storage 290 are omitted.

As described above, the block scan controller 270 may determine to perform the scan operation on memory blocks in the semiconductor memory device 100, except those registered in the SPO block table 251. In this case, the block scan controller 270 may receive the SPO block information $INF_{SPO}$ from the SPO information storage 250. The SPO block information $INF_{SPO}$ may be information indicating memory blocks registered in the SPO block table 251 among the plurality of memory blocks BLK1 to BLKz.

The block scan controller 270 may control the scan operation based on the SPO block information $INF_{SPO}$. More specifically, the block scan controller 270 may generate a scan control signal $CTR_{SCN}$ which controls the command generator 230 to perform the scan operation on all memory blocks except for SPO blocks BLK1 and BLK4 registered in the SPO block table 251. The command generator 230 generates commands CMDs for scanning the applicable memory blocks in the semiconductor memory device 100, based on the scan control signal $CTR_{SCN}$ received from the block scan controller 270. Since the block scan controller 270 generates the scan control signal $CTR_{SCN}$ such that the scan operation is performed only on the memory blocks that are not registered in the SPO block table 251, i.e., all memory blocks except for the SPO blocks BLK1 and BLK4, the command generator 230 may also generate the commands CMDs such that the scan operation is performed only on memory blocks that are not registered in the SPO block table 251.

The commands CMDs generated for the scan operation are transferred to the semiconductor memory device 100. Accordingly, the semiconductor memory device 100 may perform the scan operation only on memory blocks that are not registered in the SPO block table 251, which in this example, is all memory blocks except for the SPO blocks BLK1 and BLK4 registered in the SPO block table 251.

Figure 12:
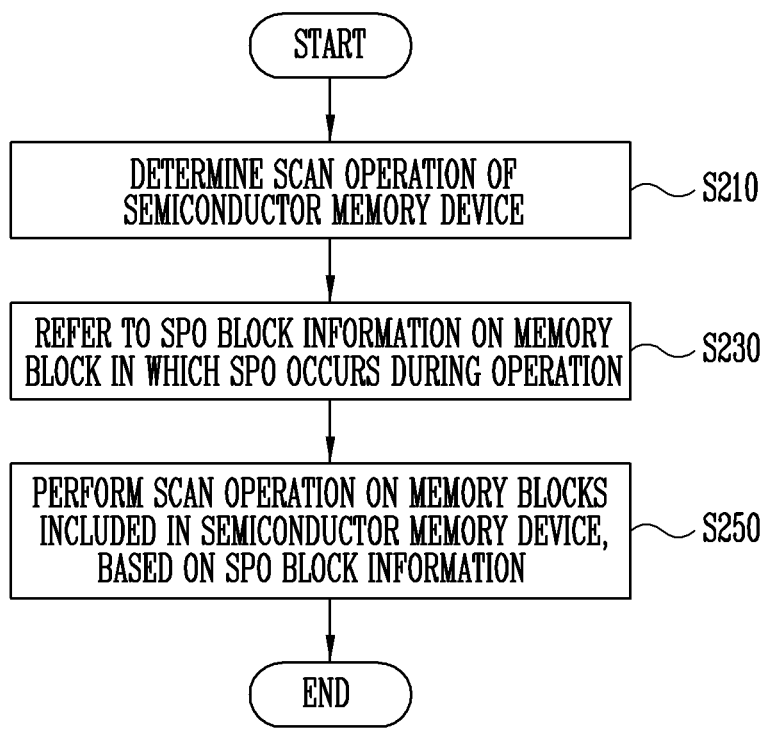
FIG. 12 is a flowchart illustrating a method of operating the controller according to an embodiment of the present disclosure.

FIG. 12 is a flowchart illustrating a method of operating the controller 200 according to an embodiment of the present disclosure.

Referring to FIG. 12, the method of operating the controller 200 includes determining to perform a scan operation of a semiconductor memory device (S210), referring to SPO block information to identify memory block(s) in which an SPO occurred during an operation (S230), performing the scan operation on memory blocks in the semiconductor memory device 100, based on the SPO block information (S250).

In step S210, the block scan controller 270 may determine to perform the scan operation of the semiconductor memory device 100 based on any of various conditions. In one example, the block scan controller 270 may determine to perform the scan operation periodically, that is, at set time intervals. In another example, the block scan controller 270 may determine to perform the scan operation when the memory system 1000 is turned on. In still another example, the block scan controller 270 may determine to perform the scan operation when the memory system 1000 is idle.

In step S230, the controller 200 may refer to the SPO block information $INF_{SPO}$ stored in the SPO information storage 250. Specifically, the block scan controller 270 receives the SPO block information $INF_{SPO}$ from the SPO information storage 250. The SPO block information $INF_{SPO}$ may indicate memory blocks registered in the SPO block table 251 among the plurality of memory blocks BLK1 to BLKz in the semiconductor memory device 100. As described above, in step S230, each memory block that was a target of an operation at the time of the SPO occurrence may be identified.

In step S250, the controller 200 performs the scan operation on the memory blocks in the semiconductor memory device based on the referenced SPO block information. More specifically, the block scan controller 270 may generate the scan control signal $CTR_{SCN}$ such that the scan operation is performed only on memory blocks that are not registered in the SPO block table 251. The command generator 230 may generate the commands CMDs such that the scan operation is performed only on remaining memory blocks that are not registered in the SPO block table 251 in response to the generated scan control signal $CTR_{SCN}$. The semiconductor memory device 100 may perform the scan operation only on all memory blocks except for the SPO blocks, e.g., BLK1 and BLK4, registered in the SPO block table 251, based the generated commands CMDs. A more detailed description of step S250 is given below with reference to FIG. 13.

Figure 13:
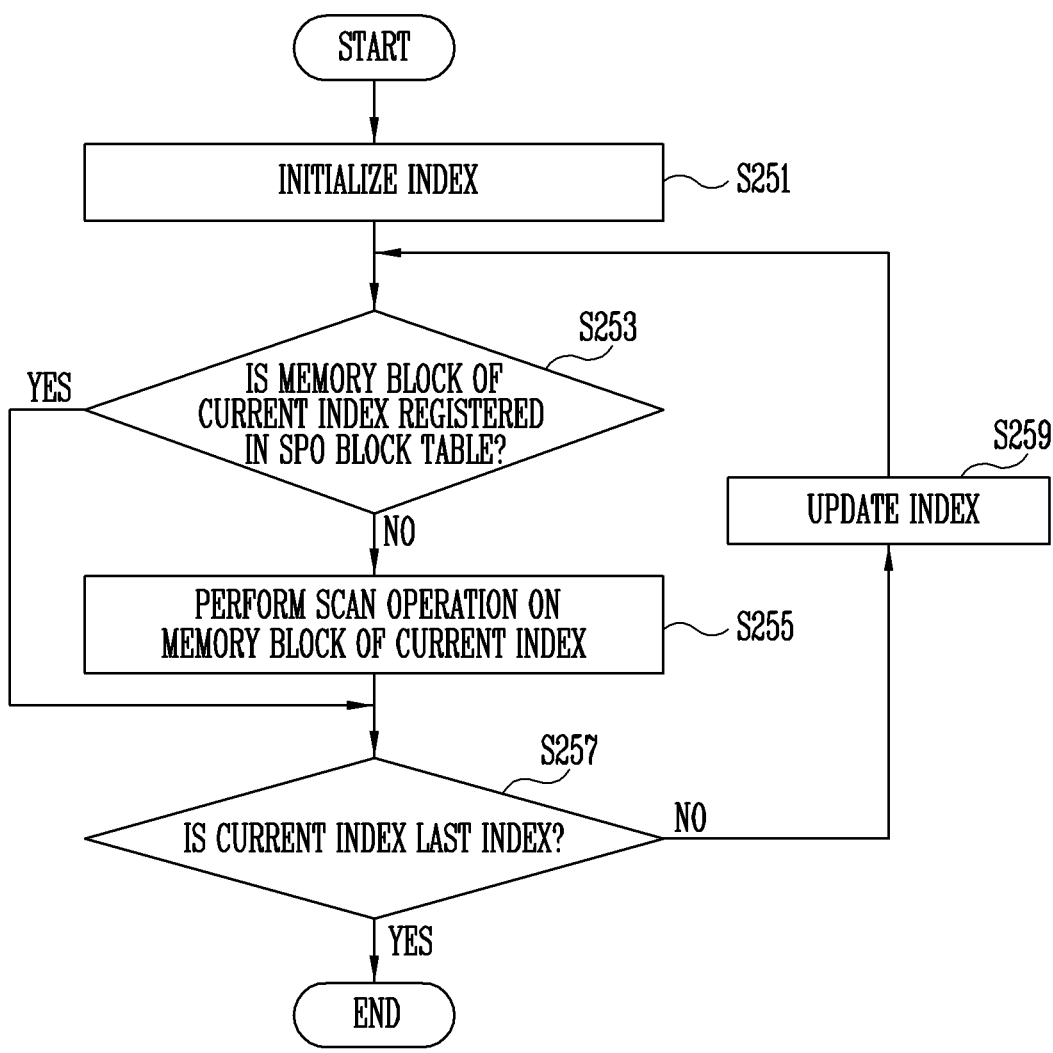
FIG. 13 is a flowchart illustrating an embodiment of step S250 of FIG. 12.

FIG. 13 is a flowchart illustrating an embodiment of step S250 of FIG. 12.

Referring to FIG. 13, first, an index is initialized in step S250 (S251). The index may be a number indicating the memory block on which the scan operation potentially is to be performed. Referring to FIG. 2 or 11, the semiconductor memory device 100 includes the first to z-th memory blocks BLK1 to BLKz. Therefore, the index has a value from 1 to z. In step S251, the index is initialized to 1, and at each iteration, the index is incremented to identify the next memory block for scan operation consideration.

In step S253, it is determined whether the memory block of the current index is registered in the SPO block table 251. Since the current index is 1, it is determined whether the first memory block BLK1 is registered in the SPO block table 251. Referring to the example of the SPO block table 251 shown in FIG. 9B and FIG. 11, the first memory block BLK1 is registered in the SPO block table 251. Therefore, the method proceeds to step S257, skipping the scan operation of step S255.

That is, the scan operation of step S255 is not performed on the first memory block BLK1.

In step S257, it is determined whether the current index is the last index. Since the current index is 1 and the last index is z, the method proceeds to step S259. In step S259, the index is updated. In an embodiment, the index may be updated incrementing the index value by 1. In this case, the index is updated to 2. After performing step S259, the method proceeds to step S253 again.

As a result of the determination of step S253, since the second memory block BLK2, which is the memory block of the current index, is not registered in the SPO block table 251, the method proceeds to step S255. In step S255, the scan operation is performed on the second memory block BLK2. Thereafter, as a result of the determination of step S257, since in the illustrated embodiment 2 which is the current index is not z which is the last index, the method proceeds to step S259.

In such a method, the scan operation is selectively performed on the first memory block BLK1 to the z-th memory block BLKz, excluding memory block(s) registered in the SPO block table 251. That is, the scan operation is not performed on any memory block registered in the SPO block table 251 according to the determination of step S253, but the scan operation is performed on all other memory blocks according to the determination of step S253. After all memory blocks are considered for a scan operation and a scan operation is performed on all those not registered in the SPO block table 251, step S250 ends.

As shown in FIGS. 12 and 13, the controller 200 controls the semiconductor memory device 100 to perform the scan operation only on memory blocks that are not registered in the SPO block table 251, with reference to the SPO block table 251. Accordingly, an unnecessary scan operation on the SPO block may be omitted, and a situation in which it is incorrectly determined that the memory cells of the memory block in which data is incompletely stored by the SPO is deteriorated may be prevented.

Figures 14A, 14B:
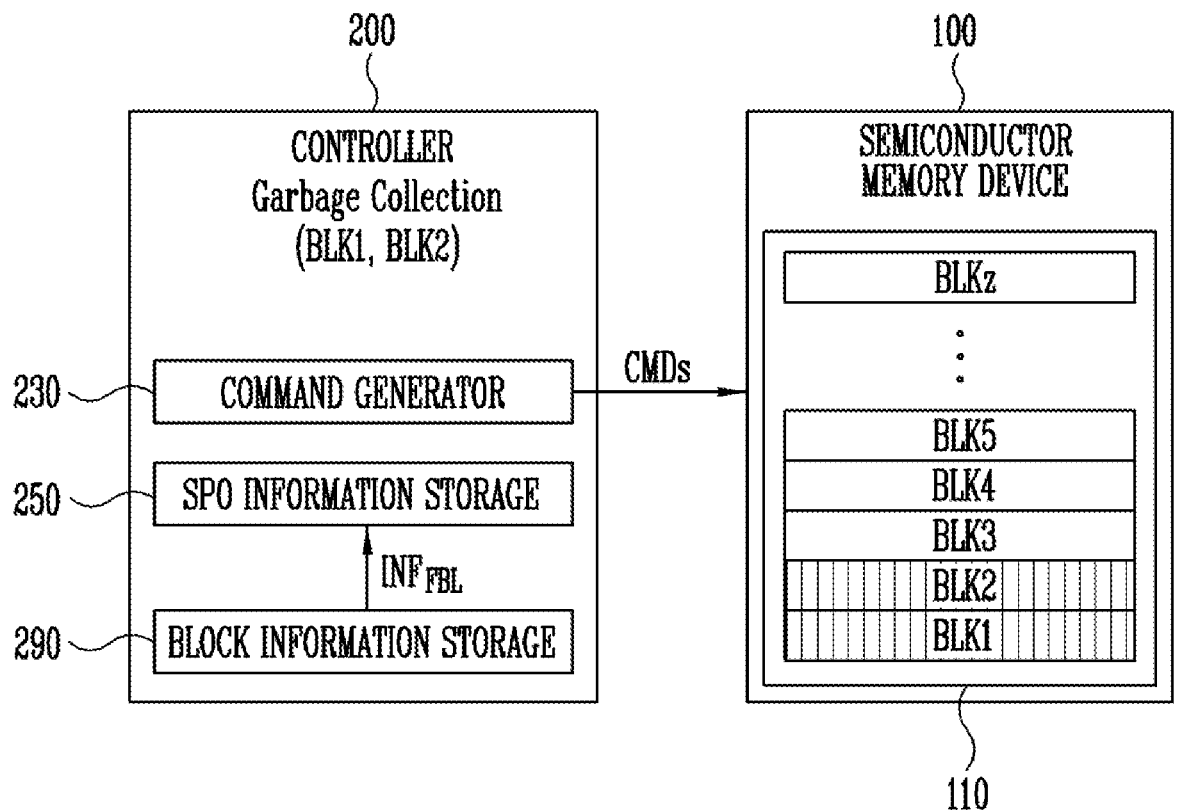
FIGS. 14A and 14B are diagrams for describing an operation of deleting a memory block switched to a free block according to garbage collection from an SPO block table.

FIGS. 14A and 14B are diagrams for describing an operation of deleting a memory block switched to a free block from the SPO block table 251 through garbage collection. In FIG. 14A, for clarity, the SPO sensor 210 and the block scan controller 270 are omitted.

FIG. 14A illustrates a case where the controller 200 performs a garbage collection operation using the first and second memory blocks BLK1 and BLK2 as victim blocks. Since the first and second memory blocks BLK1 and BLK2 are selected as the victim blocks, valid data stored in the first and second memory blocks BLK1 and BLK2 is moved (copied) to one or more free blocks among the third to z-th memory blocks BLK3 to BLKz according to the garbage collection operation. After that, all valid data stored in the first and second memory blocks BLK1 and BLK2 are changed to invalid data, and the first and second memory blocks BLK1 and BLK2 are switched from open blocks to free blocks.

According to the garbage collection operation, the block information storage 290 is updated. Before the garbage collection operation, the first and second memory blocks BLK1 and BLK2 are in an open block state. Therefore, the block information storage 290 may store block information indicating that the first and second memory blocks BLK1 and BLK2 are open blocks. When the first and second memory blocks BLK1 and BLK2 become free blocks as a result of the garbage collection operation, the block information storage 290 updates the block information. As a result of the update, the block information storage 290 stores block information indicating that the first and second memory blocks BLK1 and BLK2 are free blocks.

When the block information is updated to indicate that the first and second memory blocks BLK1 and BLK2 are free blocks, the block information storage 290 generates the free block information $INF_{FBL}$ to indicate that the status of one or more blocks is updated to free block status. That is, the free block information $INF_{FBL}$ may indicate that the first and second memory blocks BLK1 and BLK2 are updated to free blocks. The generated free block information $INF_{FBL}$ is transferred to the SPO information storage 250.

The SPO information storage 250 updates the SPO block table 251 based on the received free block information $INF_{FBL}$. The SPO information storage 250 determines whether there is a memory block registered in the SPO block table 251 corresponding to the received free block information $INF_{FBL}$. When there is a memory block registered in the SPO block table 251 corresponding to the received free block information $INF_{FBL}$, the SPO information storage 250 deletes the corresponding memory block from the SPO block table 251.

Referring to the SPO block table 251 shown in FIG. 9B, before the garbage collection operation, the first and fourth memory blocks BLK1 and BLK4 are registered in the SPO block table 251 as SPO blocks. Thereafter, since the memory blocks corresponding to the received free block information $INF_{FBL}$ are the first and second memory blocks BLK1 and BLK2, as shown in FIG. 14B, the SPO information storage 250 deletes the first memory block BLK1 from the SPO block table 251. This is because it is not necessary to continue to manage whether the first memory block BLK1 undergoes SPO because the first memory block BLK1 is switched to a free block. However, when the SPO occurs again during a subsequent operation of the first memory block BLK1, the first memory block BLK1 is registered in the SPO block table 251 again.

Figure 15:
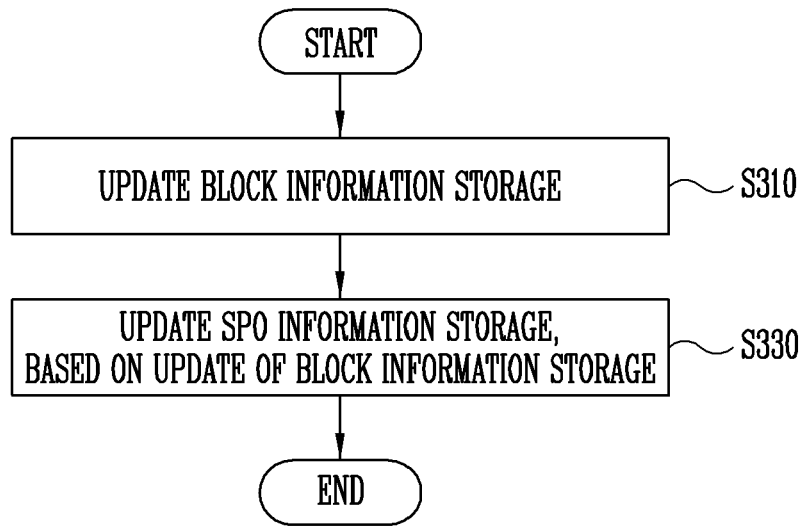
FIG. 15 is a flowchart illustrating a method of operating the controller 200 according to an embodiment of the present disclosure.

FIG. 15 is a flowchart illustrating a method of operating the controller 200 according to an embodiment of the present disclosure. As described above, when a specific block registered in the SPO block table 251 is switched from an open block to a free block, that memory block is deleted from the SPO block table 251. FIG. 15 illustrates such a process.

In step S310, the block information storage 290 is updated. As shown in FIG. 14A, the block information storage 290 may be updated by the garbage collection operation. In this case, the first and second memory blocks BLK1 and BLK2 that were the open blocks may be updated to free blocks.

In step S330, the SPO information storage 290 is updated based on the update of the block information storage. When the block information storage 290 is updated, the block information storage 290 generates the free block information $INF_{FBL}$ indicating each memory block switched to a free block and transfers the free block information $INF_{FBL}$ to the SPO information storage 250. The SPO information storage 250 updates the SPO block table 251 based on the received free block information $INF_{FBL}$.

A specific embodiment of step S330 of updating the SPO information storage based on the update of the block information storage is described below with reference to FIG. 16.

Figure 16:
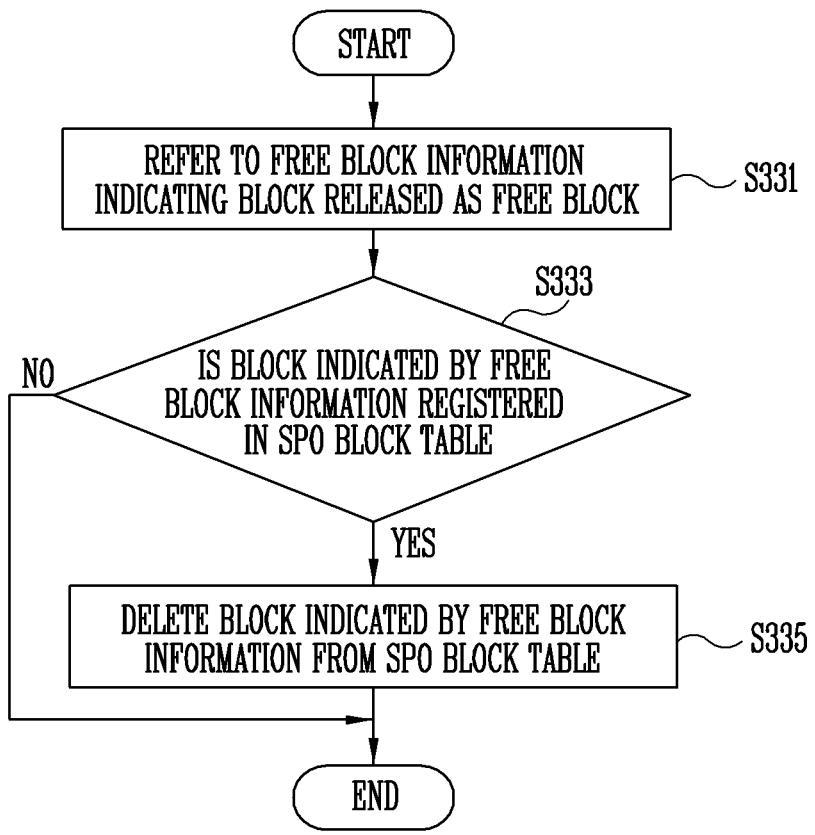
FIG. 16 is a flowchart illustrating an embodiment of step S330 of FIG. 15.

FIG. 16 is a flowchart illustrating an embodiment of step S330 of FIG. 15.

Referring to FIG. 16, the controller 200 refers to free block information indicating one or more blocks released as free block(s) (S331). More specifically, in step S331, the SPO information storage 250 receives the free block information $INF_{FBL}$ indicating the block(s) released as free block(s) from the block information storage 290. In the example of FIG. 14A, the free block information $INF_{FBL}$ indicates the first and second memory blocks BLK1 and BLK2.

Thereafter, the controller 200 determines whether each block indicated by the free block information $INF_{FBL}$ is registered in the SPO block table 251 (S333). Referring to FIGS. 9B and 14A together, the first and fourth memory blocks BLK1 and BLK4 are registered in the SPO block table 251, and the free block information $INF_{FBL}$ includes the first and second memory blocks BLK1 and BLK2. Therefore, a result of the determination of step S333 is "YES", and the method proceeds to step S335.

Thereafter, the controller 200 deletes the memory block(s) indicated by the free block information $INF_{FBL}$ from the SPO block table 251 (S335). Since the first and fourth memory blocks BLK1 and BLK4 are registered in the SPO block table 251, and the free block information $INF_{FBL}$ indicates the first and second memory blocks BLK1 and BLK2, as shown in FIG. 14B, in step S335, the first memory block BLK1 may be deleted from the SPO block table 251.

As another example, when the block indicated by the free block information $INF_{FBL}$ is not registered in the SPO block table 251 (S333; No), there is no memory block to be deleted from the SPO block table 251. Hence, step S335 is not performed and step S330 of FIG. 15 ends.

Figure 17:
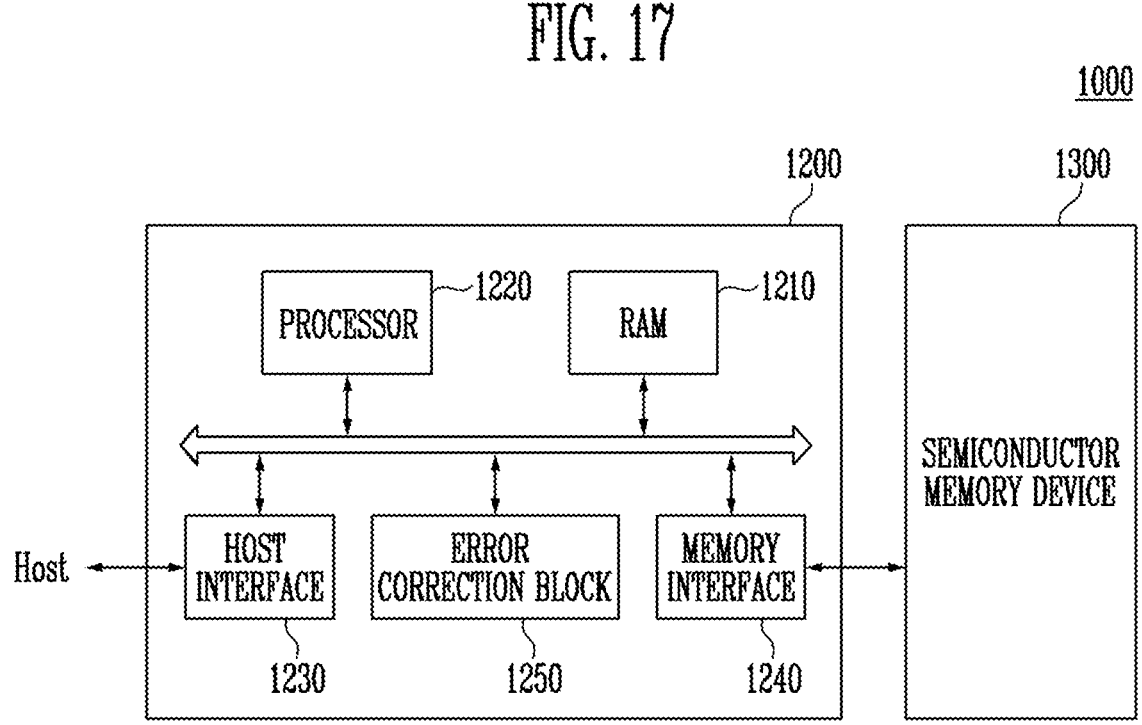
FIG. 17 is a block diagram illustrating a memory system including a semiconductor memory device, such as that of FIG. 2 and a controller, such as that of FIG. 7.

FIG. 17 is a block diagram illustrating a memory system 1000 including a semiconductor memory device, such as that of FIG. 2 and a controller, such as that of FIG. 7.

Referring to FIG. 17, the memory system 1000 includes the semiconductor memory device 1300 and the controller 1200.

The semiconductor memory device 1300 may be configured and operate in the same manner as the semiconductor memory device 100 described with reference to FIG. 2.

The controller 1200 is operably coupled to the host (Host) and the semiconductor memory device 1300. The controller 1200 is configured to access the semiconductor memory device 1300 in response to the request from the host. For example, the controller 1200 is configured to control read, program, erase, and background operations of the semiconductor memory device 1300. The controller 1200 is configured to provide an interface between the semiconductor memory device 1300 and the host. The controller 1200 is configured to drive firmware for controlling the semiconductor memory device 1300.

The controller 1200 includes a random access memory (RAM) 1210, a processor 1220, a host interface 1230, a memory interface 1240, and an error correction block 1250.

The RAM 1210 is used as an operation memory of the processor 1220, a cache memory between the semiconductor memory device 1300 and the host, and/or a buffer memory between the semiconductor memory device 100 and the host. At least one of the SPO information storage 250 and the block information storage 290 shown in FIG. 7 may be implemented in a form of the RAM 1210 shown in FIG. 17. However, as described above, in another embodiment, the SPO information storage 250 may also be implemented with a non-volatile memory device.

The processor 1220 controls overall operation of the controller 1200. The processor 1220 is configured to control a read operation, a program operation, an erase operation, and a background operation of the semiconductor memory device 1300. The processor 1220 is configured to drive firmware for controlling the semiconductor memory device 1300. The processor 1220 may perform a function of a flash translation layer (FTL). The processor 1220 may convert a logical block address (LBA) provided by the host into a physical block address (PBA) through the flash translation layer (FTL). The flash translation layer (FTL) may receive a logical block address (LBA) by using a mapping table and translate the logical block address (LBA) into a physical block address (PBA). There are several address mapping methods that may be used by the flash translation layer according to a mapping unit. Representative address mapping methods include a page mapping method, a block mapping method, and a hybrid mapping method.

The SPO sensor 210, the command generator 230, and the block scan controller 270 shown in FIG. 7 may be implemented in a form of software or firmware driven by the processor 1220.

The host interface 1230 includes a protocol for performing data exchange between the host and the controller 1200. In an embodiment, the controller 1200 is configured to communicate with the host through at least one of various interface protocols such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial ATA protocol, a parallel ATA protocol, a small computer small interface (SCSI) protocol, an enhanced small disk interface (ESDI) protocol, an integrated drive electronics (IDE) protocol, and/or a private protocol.

The memory interface 1240 interfaces with the semiconductor memory device 1300. For example, the memory interface 1240 includes a NAND interface or a NOR interface.

The error correction block 1250 is configured to detect and correct an error of data received from the semiconductor memory device 1300 using an error correcting code (ECC). The error correction block 1250 may correct an error by using an error correction code on read page data. The error correction block 1250 may correct an error by using a low density parity check (LDPC) code, a Bose, Chaudhri, Hocquenghem (BCH) code, a turbo code, a reed-Solomon code, a convolution code, a recursive systematic code (RSC), coded modulation such as trellis-coded modulation (TCM), block coded modulation (BCM), and/or a hamming code.

During a read operation, the error correction block 1250 may correct an error of the read page data. Decoding may be deemed a failure when the number of error bits in data of the read page exceed a correctable number of bits. The decoding may be deemed successful when the number of error bits in the data of the read page are equal to or less than the correctable number of bits. Successful decoding indicates that a read command has passed. Failed decoding indicates that the read command has failed. When the decoding is successful, the controller 1200 outputs page data in which the error is corrected to the host.

The controller 1200 and the semiconductor memory device 1300 may be integrated into one semiconductor device. In an embodiment, the controller 1200 and the semiconductor memory device 1300 may be integrated into one semiconductor device to form a memory card, such as a PC card (personal computer memory card international association (PCMCIA)), a compact flash card (CF), a smart media card (e.g., SM or SMC), a memory stick, a multimedia card (e.g., MMC, RS-MMC, or MMCmicro), a secure digital (SD) card (e.g., SD, miniSD, microSD, or SDHC), and/or a universal flash storage (UFS).

The controller 1200 and the semiconductor memory device 1300 may be integrated into one semiconductor device to form a semiconductor drive (e.g., solid state drive (SSD)). The semiconductor drive (SSD) includes a storage device configured to store data in a semiconductor memory. When the memory system is used as the semiconductor drive (SSD), operation speed of the host operably coupled to the memory system is dramatically improved.

As another example, the memory system is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, and a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 1300 or the memory system may be mounted as a package of any of various types. For example, the semiconductor memory device 1300 or the memory system may be packaged and mounted as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSOP), a thin small outline package (TSOP), a system in package (SIP), a multi-chip package (MCP), a wafer-level fabricated package (WFP), or a wafer-level processed stack package (WSP).

Figure 18:
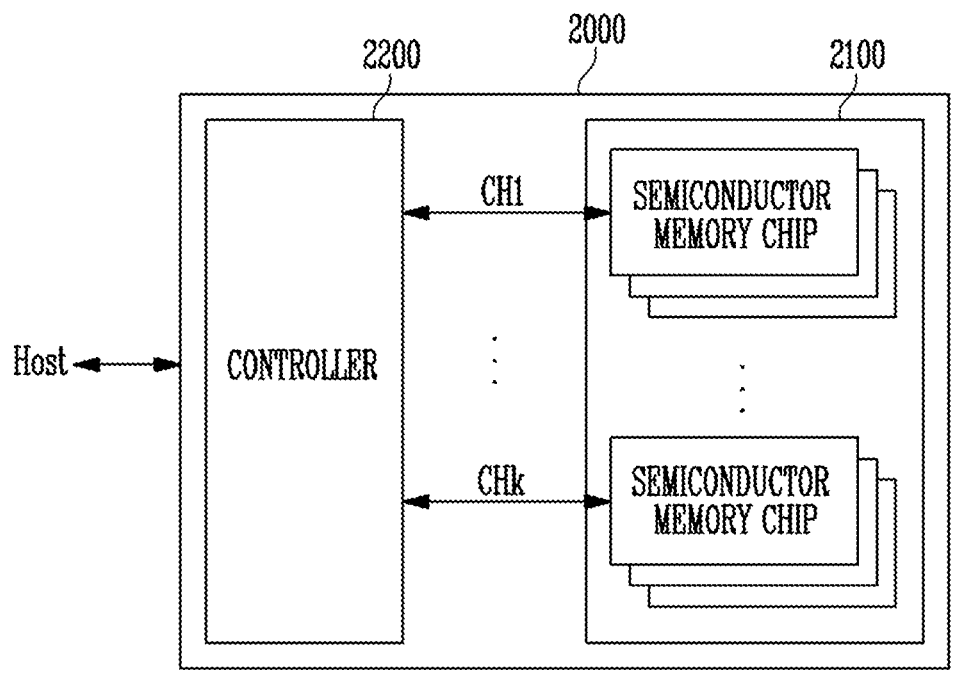
FIG. 18 is a block diagram illustrating an application example of a memory system, such as that of FIG. 17.

FIG. 18 is a block diagram illustrating an application example 2000 of the memory system of FIG. 17.

Referring to FIG. 18, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 18, the plurality of, e.g., k, groups communicate with the controller 2200 through first to k-th channels CH1 to CHk, respectively. Each semiconductor memory chip is configured and is operated similarly to the semiconductor memory device 1300 described with reference to FIG. 17.

Each group of semiconductor memory chips is configured to communicate with the controller 2200 through one common channel. The controller 2200 is configured similarly to the controller 1200 described with reference to FIG. 17 and is configured to control the plurality of memory chips of the semiconductor memory device 2100 through the plurality of channels CH1 to CHk.

In FIG. 18, multiple semiconductor memory chips are connected to one channel. However, it will be understood that the memory system 2000 may be modified such that one semiconductor memory chip is connected to one channel.

Figure 19:
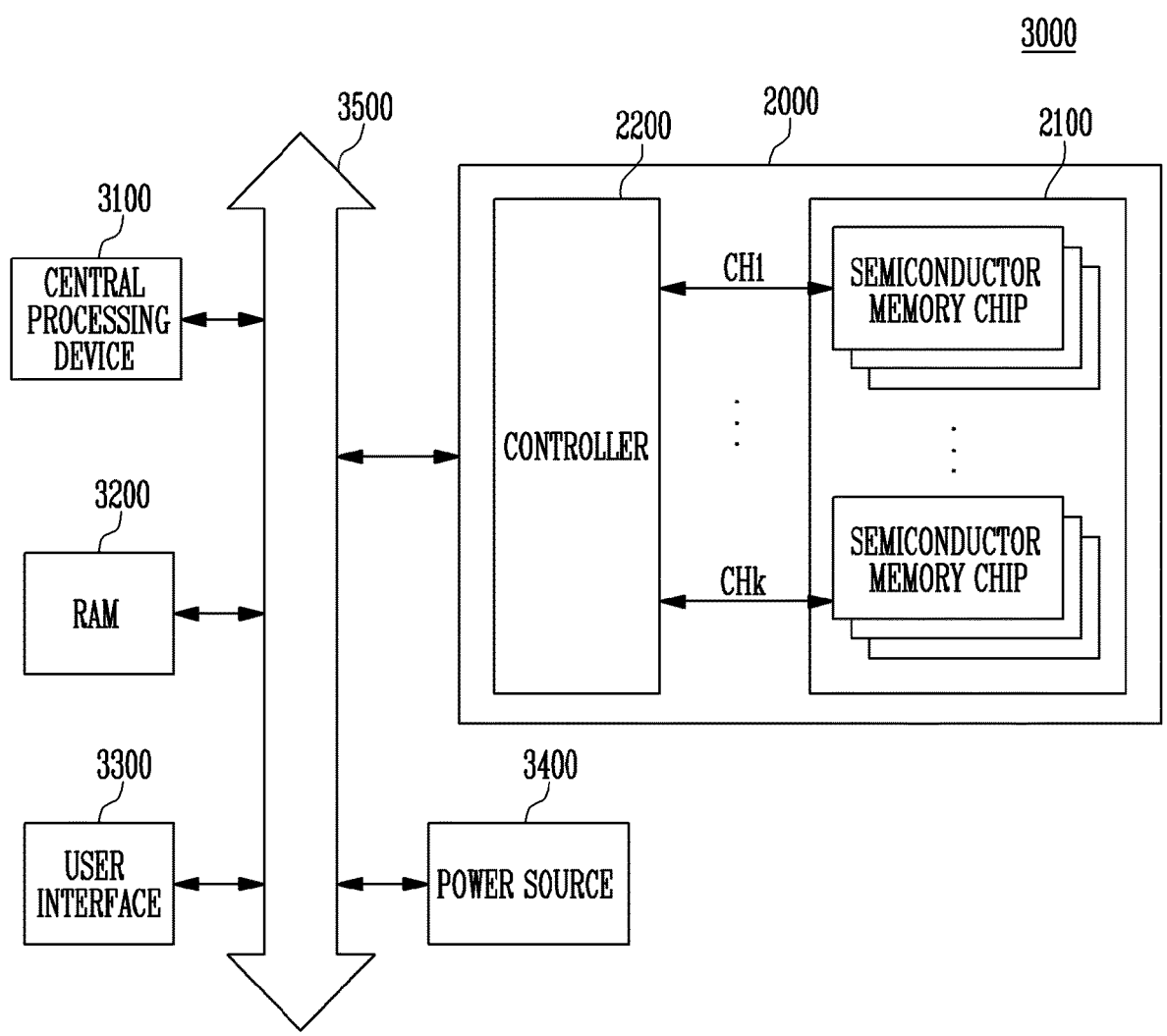
FIG. 19 is a block diagram illustrating a computing system including a memory system, such as that of FIG. 18.

FIG. 19 is a block diagram illustrating a computing system 3000 including the memory system described with reference to FIG. 18.

Referring to FIG. 19, the computing system 3000 includes a central processing device 3100, a random access memory (RAM) 3200, a user interface 3300, a power source 3400, a system bus 3500, and the memory system 2000.

The memory system 2000 is electrically coupled to the central processing device 3100, the RAM 3200, the user interface 3300, and the power source 3400 through the system bus 3500. Data provided through the user interface 3300 or processed by the central processing device 3100 is stored in the memory system 2000.

In FIG. 19, the semiconductor memory device 2100 is operably coupled to the system bus 3500 through the controller 2200. However, the semiconductor memory device 2100 may be configured to be directly coupled to the system bus 3500. A function of the controller 2200 is performed by the central processing device 3100 and the RAM 3200.

In FIG. 19, the memory system 2000 may be that described with reference to FIG. 18. However, in another embodiment, the memory system 2000 may be that of the memory system 1000 described with reference to FIG. 17. In an embodiment, the computing system 3000 may be configured to include both memory systems 1000 and 2000.

Various embodiments of the present invention have been illustrated and described. Although specific terminologies are used herein, they are used only in the descriptive sense. The present invention is not limited to or by any such term nor any of the above-described embodiments, as many variations are possible within the spirit and scope of the present invention. The present invention encompasses all such variations to the extent that they fall within the scope of the claims.

What is claimed is:

1. A controller that controls an operation of a semiconductor memory device including a plurality of memory blocks, the controller comprising:
   a command generator configured to generate a command for controlling the semiconductor memory device;
   a sudden power off information storage configured to store sudden power off block information indicating a target memory block which is a memory block that was performing an operation when sudden power off occurred at the controller; and
   a block scan controller configured to control the command generator to perform a scan operation on the plurality of memory blocks, except the target memory block, in response to the sudden power off block information,
   wherein the sudden power off occurring at the controller includes a decrease of a voltage supplied to the controller.

2. The controller of claim 1, wherein the sudden power off information storage stores sudden power off block table, and
   the sudden power off information storage registers the target memory block in the sudden power off block table when the sudden power off occurs at the controller.

3. The controller of claim 1, wherein
   the command generator generates one or more commands for controlling an end operation performed in correspondence with the sudden power off when the sudden power off occurs at the controller.

4. The controller of claim 3, wherein the end operation includes flushing write data received from a host by the semiconductor memory device.

5. The controller of claim 3, wherein the end operation includes storing an updated mapping table and a sudden power off block table in the semiconductor memory device.

6. The controller of claim 1, wherein the block scan controller generates a scan control signal for controlling a scan operation on the plurality of memory blocks, except the target memory block, based on the sudden power off block information and transfers the scan control signal to the command generator, and
   the command generator generates a command for controlling the scan operation based on the scan control signal.

7. The controller of claim 6, wherein the sudden power off block information indicates a memory block registered in a sudden power off block table, and
   the block scan controller generates the scan control signal to perform a scan operation on the memory blocks except for the memory block indicated by the sudden power off block information, among the plurality of memory blocks.

8. The controller of claim 2, further comprising:
   a block information storage configured to store information indicating a block state for each of the plurality of memory blocks,
   wherein, when at least one memory block among the plurality of memory blocks is switched from an open block to a free block, the block information storage generates free block information indicating a memory block switched to the free block and transfers the free block information to the sudden power off information storage.

9. The controller of claim 8, wherein the sudden power off information storage deletes a memory block corresponding to the free block information from the sudden power off block table.

10. A method of operating a controller that controls a semiconductor memory device including a plurality of memory blocks, the method comprising:
    determining that sudden power off has occurred at the controller;
    registering a target memory block, which is a memory block that was performing an operation when sudden power off occurred at the controller, in a sudden power off block table;
    determining whether to perform a scan operation of the semiconductor memory device;
    identifying at least one memory block including the target memory block registered in the sudden power off block table; and
    performing a scan operation on the plurality of memory blocks, except for the identified at least one memory block,
    wherein the sudden power off occurring at the controller includes a decrease of a voltage supplied to the controller.

11. The method of claim 10, further comprising:
    performing an end operation corresponding to the sudden power off after registering the target memory block.

12. The method of claim 11, wherein the end operation includes flushing write data received from a host by the semiconductor memory device.

13. The method of claim 11, wherein the end operation includes storing an updated mapping table in the semiconductor memory device.

14. The method of claim 10, further comprising, after registering the target memory block:
- switching at least one open memory block registered in the sudden power off block table to a free memory block; and
- deleting the at least one switched memory block from the sudden power off block table.

15. The method of claim 10, wherein performing the scan operation on the plurality of memory blocks except for the identified at least one memory block, comprises:
- initializing an index indicating a memory block on which a scan operation is to be performed;
- determining whether a memory block of a current index is registered in the sudden power off block table; and
- selectively performing a scan operation on the memory block of the current index based on a result of the determination.

16. The method of claim 15, wherein selectively performing the scan operation on the memory block of the current index based on the result of the determination comprises:
- updating the index without performing the scan operation on the memory block of the current index when the memory block of the current index is registered in the sudden power off block table.

17. The method of claim 15, wherein selectively performing the scan operation on the memory block of the current index based on the result of the determination comprises:
- performing the scan operation on the memory block of the current index and updating the index when the memory block of the current index is not registered in the sudden power off block table.

18. A method of operating a controller that controls a semiconductor memory device including a plurality of memory blocks, the method comprising:
- determining whether to perform a scan operation on the semiconductor memory device;
- referring to sudden power off block information on a target memory block that was performing an operation when sudden power off occurred at the controller; and
- selectively performing the scan operation on the plurality of memory blocks based on the sudden power off block information,
- wherein the sudden power off occurring at the controller includes a decrease of a voltage supplied to the controller.

19. The method of claim 18, wherein selectively performing the scan operation comprises performing the scan operation on the plurality of memory blocks except for the target memory block.

20. The method of claim 18, wherein selectively performing the scan operation on the plurality of memory blocks based on the sudden power off block information comprises:
- initializing an index indicating a memory block on which the scan operation is to be performed;
- determining whether a memory block of a current index corresponds to the sudden power off block information; and
- performing the scan operation on the memory block of the current index when the memory block of the current index does not correspond to the sudden power off block information.

* * * * *